US007675211B2

(12) United States Patent
Dimascio et al.

(10) Patent No.: US 7,675,211 B2
(45) Date of Patent: Mar. 9, 2010

(54) METHOD OF ASSEMBLING A ROTOR SHAFT ASSEMBLY

(75) Inventors: Paul Stephen Dimascio, Greer, SC (US); Bradley Graham Moore, Greenville, SC (US); Roman Kolar, Hendersonville, NC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/682,464

(22) Filed: Mar. 6, 2007

(65) Prior Publication Data

US 2008/0218006 A1 Sep. 11, 2008

(51) Int. Cl.
*H02K 7/08* (2006.01)

(52) U.S. Cl. .............. 310/90; 29/44; 29/55; 29/898.07; 29/898.09; 29/889

(58) Field of Classification Search ................... 310/90; 29/898.07, 898.09, 889; 290/44, 55
See application file for complete search history.

(56) References Cited

U.S. PATENT DOCUMENTS

| RE24,911 E | * | 12/1960 | Leja ............................. 248/584 |
| 3,871,093 A | * | 3/1975 | Ladin ..................... 29/898.066 |
| 4,298,313 A | | 11/1981 | Hohenemser et al. |
| 4,554,496 A | * | 11/1985 | Rudich et al. ............... 318/600 |
| 4,784,568 A | * | 11/1988 | Benesh ........................ 415/4.2 |
| 4,830,570 A | * | 5/1989 | Benesh ........................ 415/4.4 |
| 4,850,792 A | * | 7/1989 | Yeoman ...................... 415/4.2 |
| 4,895,458 A | * | 1/1990 | Gerster ........................ 384/126 |
| 5,328,269 A | * | 7/1994 | Mutolo et al. ................ 384/57 |
| 5,913,548 A | * | 6/1999 | Keck ........................... 29/596 |
| 5,952,752 A | * | 9/1999 | Kim ............................ 310/90 |
| 6,327,957 B1 | | 12/2001 | Carter, Sr. |
| 6,452,299 B2 | * | 9/2002 | Drexlmaier ................. 310/91 |
| 6,609,889 B1 | | 8/2003 | Vilsboll |
| 6,619,918 B1 | | 9/2003 | Rebsdorf |
| 7,121,795 B2 | | 10/2006 | Moroz et al. |
| 7,282,808 B2 | * | 10/2007 | Shibata et al. ............... 290/55 |
| 2003/0230898 A1 | * | 12/2003 | Jamieson et al. ............. 290/55 |
| 2004/0202393 A1 | * | 10/2004 | Masui et al. ................ 384/495 |
| 2004/0232704 A1 | * | 11/2004 | Casazza et al. .............. 290/55 |
| 2006/0205553 A1 | * | 9/2006 | Lee ............................... 475/5 |
| 2007/0099745 A1 | | 5/2007 | Fox |

FOREIGN PATENT DOCUMENTS

DE 10043936 A1 * 4/2002
WO 2006/099014 A1 9/2006

* cited by examiner

*Primary Examiner*—Quyen Leung
*Assistant Examiner*—Naishadh N Desai
(74) *Attorney, Agent, or Firm*—James McGinness, Esq.; Armstrong Teasdale LLP (57) ABSTRACT

A method of assembling a rotor shaft assembly is provided. The method includes assembling a self-aligning bearing seat from a first assembly and a second assembly such that the self-aligning bearing seat substantially circumscribes a rotor shaft. The method also includes creating an interface defined between the first assembly and the second assembly, such that when the rotor shaft experiences misalignment the interface accommodates misalignment of the rotor shaft.

7 Claims, 7 Drawing Sheets

METHOD OF ASSEMBLING A ROTOR SHAFT ASSEMBLY

BACKGROUND OF THE INVENTION

This invention relates generally to rotor shaft assemblies, and more particularly, to a method of assembling a rotor shaft assembly.

Generally, a wind turbine generator includes a rotor having multiple blades. The rotor is sometimes mounted within a housing, or nacelle, that is positioned on top of a base, for example a truss or tubular tower. At least some known utility grade wind turbines (i.e., wind turbines designed to provide electrical power to a utility grid) can have rotor blades of 30 meters (m) (100 feet (ft)) or more in length and include a mechanical drive train. The drive train extends from the blades to a generator positioned within the wind turbine. As wind encounters the blades, the blades rotate, thus causing the mechanical drive train to rotate. By rotating, the drive train transfers wind energy to the generator. To efficiently transfer wind energy to the generator, the drive train should remain stationary, horizontally and vertically, while rotating. A main bearing is positioned at a blade/drive train interface and defines a location that allows the drive train to rotate while preventing the drive train from moving horizontally and vertically.

During operation, wind loading at different areas of the blades may be different and may cause the blades to bend. Because the blades are connected to the drive train, bending of the blades may cause angular misalignment, or bending, of the drive train. Consequently, known main bearings may generally be provided to accommodate angular misalignment of the drive train.

Known main bearings generally include spherical roller bearings (SRBs) to accommodate misalignment of the drive train. SRBs may provide an indeterminate force balance and also may inherently provide radial and axial bearing clearances. These radial and axial bearing clearances may not be well suited for dynamic loads imposed on drive trains, so SRBs may not achieve a twenty year useful life.

BRIEF DESCRIPTION OF THE INVENTION

In one aspect, a method of assembling a rotor shaft assembly is provided. The method includes assembling a self-aligning bearing seat from a first assembly and a second assembly such that the self-aligning bearing seat substantially circumscribes a rotor shaft. The method also includes creating an interface defined between the first assembly and the second assembly, such that when the rotor shaft experiences misalignment the interface accommodates misalignment of the rotor shaft.

In another aspect, a self-aligning bearing seat system is provided. The self-aligning bearing seat system includes a self-aligning bearing seat including a first assembly and a second assembly. An interface is defined between the first assembly and the second assembly, the self-aligning bearing seat is positioned to substantially circumscribe a shaft, such that when the shaft experiences misalignment the interface accommodates misalignment of the shaft.

In yet another aspect, an apparatus for accommodating misalignment of a rotating shaft is provided. The apparatus includes a self-aligning bearing seat including a first assembly and a second assembly. The first assembly includes a transition piece, a spacer, a front bearing seal ring and a back bearing seal ring. The second assembly includes a front socket, a back socket, a housing, a retaining plate, and at least one adjustment mechanism configured to adjust a socket gap defined between the front socket and the back socket. An anti-friction insert is also positioned at an interface defined between the first assembly and the second assembly.

DETAILED DESCRIPTION OF THE INVENTION

Figure 1:
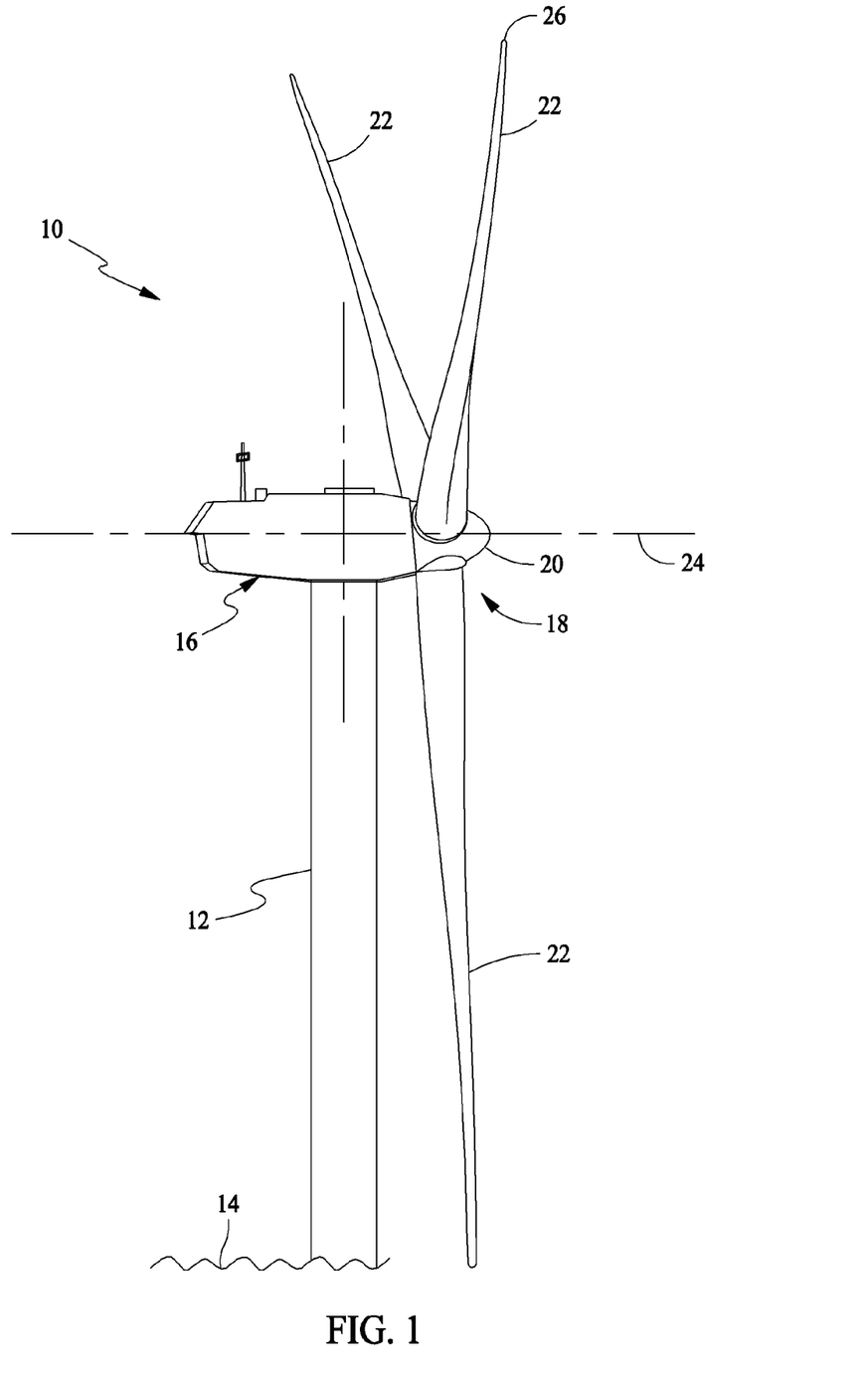
FIG. 1 is a schematic illustration of an exemplary wind turbine generator.

FIG. 1 is a schematic illustration of an exemplary wind turbine generator 10. In the exemplary embodiment, wind turbine generator 10 is a horizontal axis wind turbine. Alternatively, wind turbine 10 may be a vertical axis wind turbine. Wind turbine 10 has a tower 12 extending from a supporting surface 14, a nacelle 16 mounted on tower 12, and a rotor 18 coupled to nacelle 16. Rotor 18 has a rotatable hub 20 and a plurality of rotor blades 22 coupled to hub 20. In the exemplary embodiment, rotor 18 has three rotor blades 22. In an alternative embodiment, rotor 18 may have more or less than three rotor blades 22. A centerline 24 extends through nacelle 16 and hub 20. Each rotor blade 22 includes a tip 26. In the exemplary embodiment, tower 12 is fabricated from tubular steel and has a cavity (not shown in FIG. 1) extending between supporting surface 14 and nacelle 16. In an alternate embodiment, tower 12 is a lattice tower. The height of tower 12 is selected based upon factors and conditions known in the art. Blades 22 are positioned about rotor hub 20 to facilitate rotating rotor 18 to transfer kinetic energy from the wind into usable mechanical energy, and subsequently, electrical energy.

Figure 2:
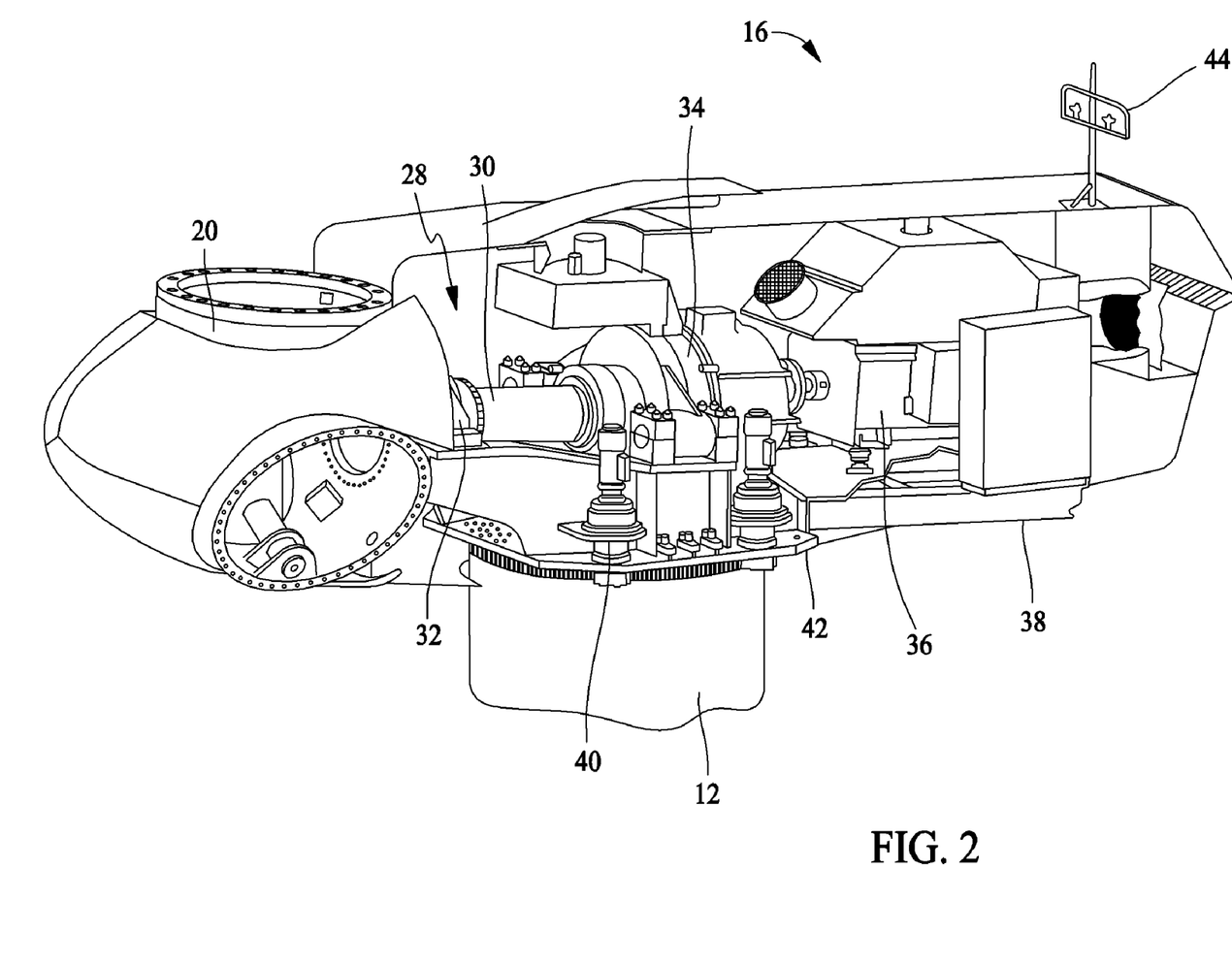
FIG. 2 is a cut-away perspective view of various components housed in a nacelle of the exemplary wind turbine configuration shown in FIG. 1.

FIG. 2 is a cut away perspective view of various components housed in nacelle 16 atop tower 12 of wind turbine 10 shown in FIG. 1. More specifically, nacelle 16 includes a drive train 28. Drive train 28 includes a shaft 30 connected to hub 20. The shaft 30 is supported at one shaft end via a main bearing 32 and at an opposite shaft end connected rigidly to a gear box 34. In some configurations, gear box 34 utilizes a dual path geometry to drive an enclosed high-speed shaft. In other configurations, shaft 30 is coupled directly to a generator 36. The high-speed shaft (not shown in FIG. 2) is used to drive generator 36 which is mounted on a main frame 38. Generator 36 may be of any suitable type, for example and without limitation, a wound rotor induction generator or a direct drive permanent magnet generator.

Nacelle 16 also includes a yaw drive 40 and a yaw deck 42 that constitute a yaw orientation system for wind turbine 10. A meteorological boom 44 provides information regarding wind direction and/or wind speed.

Figure 3:
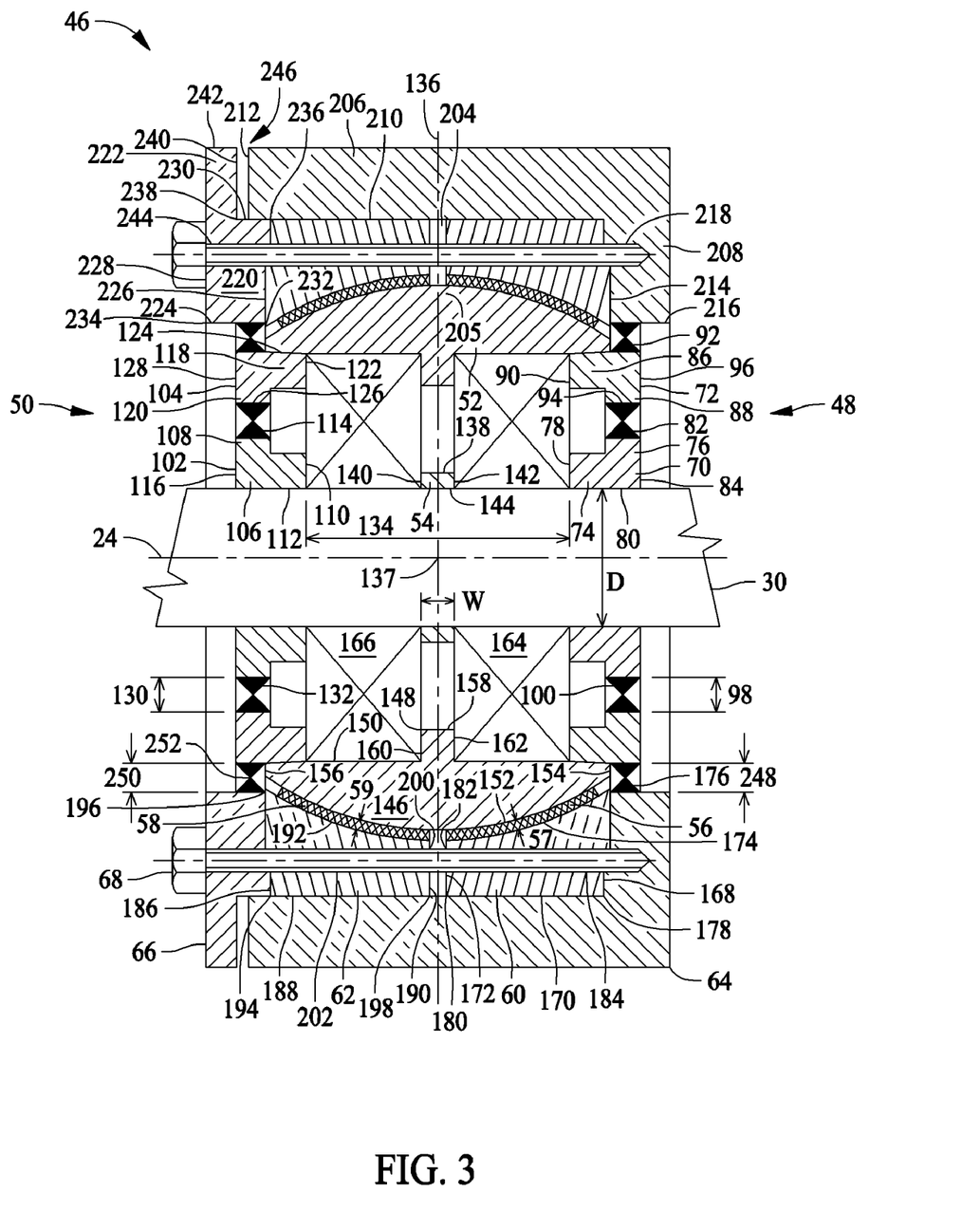
FIG. 3 is a cross-sectional view of an exemplary embodiment of a self-aligning bearing seat.

FIG. 3 is a cross-sectional view of an exemplary embodiment of a self-aligning bearing seat 46. In the exemplary embodiment, self-aligning bearing seat 46 is used in place of main bearing 32 and is positioned about and circumscribes shaft 30. More specifically, self-aligning bearing seat 46 includes back bearing seal ring 48, front bearing seal ring 50, a transition piece 52, a spacer 54, a back anti-friction insert 56, a front anti-friction insert 58, a back socket 60, a front socket 62, a bearing housing 64, a retaining plate 66 and tensioning studs 68.

Back bearing seal ring 48 includes a back inner seal ring 70 and a back outer seal ring 72. Back inner seal ring 70 is ring-shaped and has an L-shaped cross-sectional configuration that includes a long leg 74 and a short leg 76. Long leg 74 includes a terminal surface 78 and a bottom surface 80 oriented perpendicular to terminal surface 78. Short leg 76 includes a terminal surface 82 and an end surface 84. Short leg terminal surface 82 is oriented parallel to bottom surface 80. End surface 84 is oriented parallel to terminal surface 78 and perpendicular to bottom surface 80 and short leg terminal surface 82. Back inner seal ring 70 has an inside diameter defined by bottom surface 80, substantially identical to a diameter D of shaft 30, and an outside diameter defined by short leg terminal surface 82. Bottom surface 80 is press-fit against shaft 30 such that back inner seal ring 70 circumscribes shaft 30. It should be understood that, during operation of wind turbine 10, back inner seal ring 70 rotates with shaft 30 and back outer seal ring 72 remains stationary.

Back outer seal ring 72 is ring-shaped and has an L-shaped cross-sectional configuration including a long leg 86 and a short leg 88. Long leg 86 includes a terminal surface 90 and a top surface 92 oriented perpendicular to terminal surface 90. Short leg 88 includes a bottom surface 94 and an end surface 96. Bottom surface 94 is oriented parallel to top surface 92. Short leg end surface 96 is oriented parallel to long leg terminal surface 90 and perpendicular to short leg bottom surface 94 and top surface 92. Back outer seal ring 72 has an inside diameter defined by short leg bottom surface 94 and an outside diameter defined by top surface 92.

Back outer seal ring 72 is positioned concentrically about back inner seal ring 70 and press-fit inside a transition piece 52, such that long leg terminal surface 90 and terminal surface 78 lie along the same line and are oriented perpendicular to shaft 30. Likewise, end surface 84 and short leg end surface 96 lie along the same line and are oriented perpendicular to shaft 30. Thus positioned, a radial gap 98 is defined between short leg bottom surface 94 and short leg terminal surface 82. A back bearing seal 100 is positioned in and about gap 98. Back bearing seal 100 keeps lubricant (not shown in FIG. 3) on the inside of gap 98 and keeps contaminants to the outside of gap 98 while allowing rotation of back inner seal ring 70 with the shaft 30 against the stationary back outer seal ring 72. It should be understood that bottom surface 80 and top surface 92 have substantially the same length. Because there is no angular misalignment between back inner seal ring 70 and back outer seal ring 72, gap 98 may be very small. Consequently, in the exemplary embodiment, back bearing seal 100 is a controlled clearance seal such as, but not limited to, labyrinth seals and bushings. However, in other embodiments, back bearing seal 100 may be any kind of seal that enables self-aligning bearing seat 46 to function as described herein.

It should be understood that back inner seal ring 70 and back outer seal ring 72 are both manufactured from hardened steel and back bearing seal 100 is manufactured from rubber. Although the exemplary embodiment describes rings 70 and 72 as manufactured from hardened steel, and back bearing seal 100 as manufactured from rubber, in other embodiments, rings 70 and 72, and seal 100 may be manufactured from any material that enables self-aligning bearing seat 46 to function as described herein.

Front bearing seal ring 50 includes a front inner seal ring 102 and a front outer seal ring 104. Front inner seal ring 102 is ring-shaped and has an L-shaped cross-sectional configuration that includes a long leg 106 and a short leg 108. Long leg 106 includes a terminal surface 110 and a bottom surface 112 oriented perpendicular to terminal surface 110. Short leg 108 includes a terminal surface 114 and an end surface 116. Inner short leg terminal surface 114 is oriented parallel to inner long leg bottom surface 112. Short leg end surface 116 is oriented parallel to inner long leg terminal surface 110, and perpendicular to inner long leg bottom surface 112 and inner short leg terminal surface 114. Front inner seal ring 102 has an inside diameter defined by inner long leg bottom surface 112, substantially identical to diameter D of shaft 30, and an outside diameter defined by inner short leg terminal surface 114. Inner long leg bottom surface 112 is press-fit against shaft 30 such that front inner seal ring 102 circumscribes shaft 30. It should be understood that, during operation of wind turbine 10, front inner seal ring 102 rotates with shaft 30 and front outer seal ring 104 remains stationary.

Front outer seal ring 104 is ring-shaped and has an L-shaped cross-sectional configuration that includes a long leg 118 and a short leg 120. Long leg 118 includes a terminal surface 122 and a top surface 124 oriented perpendicular to terminal surface 122. Outer short leg 120 includes a bottom surface 126 parallel to outer long leg top surface 124 and an end surface 128 oriented parallel to outer long leg terminal surface 122 and perpendicular to outer short leg bottom surface 126 and outer long leg top surface 124. Front outer seal ring 104 has an inside diameter defined by outer short leg bottom surface 126 and an outside diameter defined by outer long leg top surface 124.

Front outer seal ring 104 is positioned concentrically about front inner seal ring 102 and press-fit inside a transition piece 52, such that outer long leg terminal surface 122 and inner long leg terminal surface 110 lie along the same line and are oriented perpendicular to shaft 30. Likewise, short leg end surface 116 and outer short leg end surface 128 lie along the same line and are oriented perpendicular to shaft 30. Thus positioned, a radial gap 130, substantially identical to radial gap 98, is defined between inner short leg terminal surface 114 and outer short leg bottom surface 126. A front bearing seal 132 is positioned in and about gap 130. Front bearing seal 132 keeps lubricant (not shown in FIG. 3) on the inside of gap 130 and keeps contaminants to the outside of gap 130 while allowing rotation of front inner seal ring 102 with the shaft 30 against the stationary front outer seal ring 104. It should be understood that inner long leg bottom surface 112 and outer long leg top surface 124 have substantially the same length. Because there is no angular misalignment between front inner seal ring 102 and front outer seal ring 104, gap 130 may be very small. Consequently, in the exemplary embodiment, front bearing seal 132 may be a controlled clearance seal, such as, but not limited to, labyrinth seals and bushings. However, in other embodiments, front bearing seal 132 may be any kind of seal that enables self-aligning bearing seat 46 to function as described herein.

It should be understood that front inner seal ring 102 and front outer seal ring 104 are both manufactured from hardened steel and that front bearing seal 132 is manufactured from rubber. Although the exemplary embodiment describes rings 102 and 104 as manufactured from hardened steel, and front bearing seal 132 as being manufactured from rubber, in other embodiments, rings 102 and 104, and seal 132 may be manufactured from any material that enables self-aligning bearing seat 46 to function as described herein.

Back inner seal ring 70 and front inner seal ring 102 are positioned about shaft 30 so that terminal surface 78 of back inner seal ring 70 faces toward inner long leg terminal surface 110 of front inner seal ring 102 to define a space 134 therebetween. A centerline 136 defines the center of space 134 and is coincident with the centerline of self-aligning bearing seat 46.

Spacer 54 has a rectangular cross-sectional configuration and includes a spacer top surface 138, a spacer left side surface 140, a spacer right side surface 142 and a spacer bottom surface 144. Spacer left side surface 140 and spacer right side surface 142 are separated by a distance W that defines a width of spacer 54. Spacer bottom surface 144 is press-fit against shaft 30 such that spacer 54 extends radially away from shaft 30 and is positioned intermediate back bearing seal ring 48 and front bearing seal ring 50 along and symmetrically about centerline 136. In the exemplary embodiment, spacer 54 is manufactured from hardened metal. It should be appreciated that although the exemplary embodiment describes spacer 54 as manufactured from hardened metal, in other embodiments, spacer 54 may be made from any material that enables self-aligning bearing seat 46 to function as described herein. It should be understood that during operation of wind turbine 10, spacer 54 rotates with shaft 30.

Transition piece 52 includes a body 146 and a member 148. Body 146 includes a first body surface 150 and a second body surface 152. First body surface 150 includes a back end 154, a front end 156, a linear contour and member 148. Member 148 includes a square cross-sectional configuration and defines a top member side 158, a left member side 160 and a right member side 162. The distance between left member side 160 and right member side 162 defines substantially the same width W as the distance between surfaces 140 and 142 of spacer 54. Member 148 extends perpendicularly from surface 150 intermediate ends 154 and 156 symmetrically about centerline 136. It should be appreciated that although member 148 is described as having a square cross-sectional configuration and extends perpendicularly from surface 150, in other embodiments, member 148 may have any cross-sectional configuration and may extend away from surface 150 at any angle that enables self-aligning bearing seat 46 to function as described herein. It should also be appreciated that although the exemplary embodiment describes transition piece 52 as including a single piece, in other embodiments, transition piece 52 may include two semicircular segments, or pieces, or any number of segments that enables self-aligning bearing seat 46 to function as described herein. It should be understood that during operation of wind turbine 10, transition piece 52 is stationary.

In the exemplary embodiment, second body surface 152 includes a curved contour. More specifically, surface 152 includes a curved contour defined by a radius, or a radial arc. It should be appreciated that although the exemplary embodiment describes the curved contour of surface 152 as a radial arc, in other embodiments, the curved contour of surface 152 may have any radius or be defined as any type of curve, such as, but not limited to, elliptical or compound radius curve, that enables self-aligning bearing seat 46 to function as described herein. Transition piece 52 is manufactured from hardened steel. It should be appreciated that although the exemplary embodiment describes transition piece 52 as manufactured from hardened steel, in other embodiments, transition piece 52 may be manufactured from any material that enables self-aligning bearing seat 46 to function as described herein.

Transition piece 52 is positioned about back bearing seal ring 48 and front bearing seal ring 50. More specifically, transition piece 52 is positioned against outer long leg top surface 124 of front seal ring 50 and against top surface 92 of back seal ring 48, such that member 148 is oriented symmetrically about centerline 136 and such that surface 150 is axially aligned with shaft 30. Because spacer 54 and member 148 have substantially the same width W and are both positioned symmetrically about centerline 136, spacer left side surface 140 lies along the same line as left member side 160 and spacer right side surface 142 lies along the same line as right member side 162. Thus positioned, back bearing seal ring 48, front bearing seal ring 50, spacer 54 and transition piece 52 define a back bearing cavity 164 and a front bearing cavity 166 that each extend around and circumscribe shaft 30. More specifically, back bearing cavity 164 is defined by shaft 30, surface 150, surface 142, surface 162, surface 78 and surface 90. Front bearing cavity 166 is defined by shaft 30, surface 140, surface 160, surface 110, surface 122 and surface 150.

Back bearing cavity 164 and front bearing cavity 166 may each accommodate at least one bearing (not shown in FIG. 3). Moreover, it should be understood that back bearing cavity 164 and front bearing cavity 166 may each be sized to accommodate different types of bearings (not shown in FIG. 3). In the exemplary embodiment, cavities 164 and 166 are sized to accommodate bearings that do not provide radial or axial clearances and have an axial load capability. Such bearings are known as pre-loaded bearings. In the exemplary embodiment, tapered roller bearings are used because tapered roller bearings are capable of withstanding maximum loads. It should be appreciated that although the exemplary embodiment is described as using tapered roller bearings, in other embodiments, any type of bearing may be used that enables self-aligning bearing seat 46 to function as described herein. Other bearings that may be used include, but are not limited to, ball bearings, cylindrical roller bearings and fluid film bearings. However, it should be understood that SRBs are not to be used because SRBs engender radial and axial clearances. These radial and axial clearances inhibit self-aligning bearing seat 46 from functioning as described herein.

In the exemplary embodiment, means (not shown in FIG. 3) are provided that permit customizing properties and performance of self-aligning bearing seat 46. More specifically, means are provided that translate back bearing seal ring 48 and front bearing seal ring 50 axially, parallel to shaft 30. Such means include, but are not limited to, threaded bolts and threaded nuts. To increase the size of back bearing cavity 164, back bearing seal ring 48 is translated in a direction away from self-aligning bearing seat 46. Conversely, to decrease the size of back bearing cavity 164, back bearing seal ring 48 is translated in a direction towards self-aligning bearing seat 46. Likewise, front bearing seal ring 50 is translated away from self-aligning bearing seat 46 to enlarge front bearing cavity 166 and is translated towards self-aligning bearing seat 46 to reduce front bearing cavity 166. It should be understood that in the exemplary embodiment, cavities 164 and 166 are substantially identical and are symmetrically oriented about centerline 136. It should be appreciated that although the exemplary embodiment describes cavities 164 and 166 as substantially identical, in other embodiments, cavities 164 and 166 may not be substantially identical or symmetrically oriented about centerline 136, and may be any size that enables self-aligning bearing seat 46 to function as described herein. It should be understood that in the exemplary embodiment, back bearing seal ring 48 and front bearing seal ring 50 are translated independently of each other, and may be simultaneously translated in the same or opposite directions, or one may be translated while the other is not. It should be appreciated that rings 48 and 50 may be translated independently in any combination of translations that enables self-aligning bearing seat 46 to function as described herein.

In the exemplary embodiment, a back anti-friction insert 56 and a front anti-friction insert 58 are positioned against surface 152. More specifically, back anti-friction insert 56 is positioned on a side of surface 152 corresponding to back bearing cavity 164 and front anti-friction insert 58 is positioned on another side of surface 152 corresponding to front bearing cavity 166. It should be appreciated that although the exemplary embodiment describes anti-friction inserts 56 and 58 as one piece each in other embodiments anti-friction inserts 56 and 58 may each include two semicircular segments, or pieces, or any number of segments that enables self-aligning bearing seat 46 to function as described herein. In the exemplary embodiment, anti-friction inserts 56 and 58 may be manufactured from any material that is compliant and has a very low coefficient of friction with steel. Specifically, anti-friction inserts 56 and 58 may be made from plastics or metals. Plastic materials include but are not limited to, thermoplastic, thermoset, elastomer, co-polymer, fiber reinforced plastic and rubber. Metal materials include, but are not limited to, babbit and bronze. In the exemplary embodiment, anti-friction inserts 56 and 58 are not secured to surface 152. However, in other embodiments, anti-friction inserts 56 and 58 are secured to surface 152 using an adhesive, such as, but not limited to, glue. Surface 152 is lubricated in the exemplary embodiment. However, in other embodiments, surface 152 is not lubricated. It should be understood that a rotor shaft 30 dynamic response may be tuned by selecting an appropriate anti-friction insert material and by the actual geometry of self-aligning bearing seat 46, and that inserts 56 and 58 may insulate shaft 30 vibrations and reduce noise emitted by drive train 28.

Back socket 60 is ring-shaped and has a cross-sectional configuration defined by a first side 168, a second side 170, a third side 172 and a fourth side 174. First side 168 and third side 172 are parallel, have different lengths and are separated by a distance. Moreover, first side 168 includes a first side first end 176 and a first side second end 178. Third side 172 includes a third side first end 180 and a third side second end 182. Second side 170 extends between ends 178 and 180 and is perpendicular to first side 168 and third side 172. Fourth side 174 is positioned opposite second side 170, has a curved contour and extends between ends 176 and 182. More specifically, fourth side 174 is shaped to have a curved contour that concentrically aligns with curved surface 152 of transition piece 52.

In the exemplary embodiment, the radius defining the contour of curved surface 152 is substantially similar to the radius defining the curved contour of fourth side 174. It should be understood that curved surface 152 and fourth side 174 define an interface between back socket 60 and transition piece 52. In the exemplary embodiment, the interface includes a gap 57 defined between curved surface 152 and fourth side 174. Gap 57 may have any width that enables self-aligning bearing seat 46 to function as described herein. Back anti-friction insert 56 is positioned in gap 57 and is secured to surface 174 using an adhesive, such as, but not limited to, glue. However, in other embodiments, anti-friction insert 56 is not secured to surface 174. Surface 174 is not lubricated in the exemplary embodiment. However, in other embodiments, surface 174 is lubricated. Back socket 60 also includes a plurality of uniformly spaced radially positioned openings 184 that each extend axially through back socket sides 168 and 172.

Front socket 62 is ring-shaped and has a cross-sectional configuration defined by a first side 186, a second side 188, a third side 190 and a fourth side 192. First side 186 and third side 190 are parallel, have different lengths and are separated by a distance. Moreover, first side 186 includes a first side first end 194 and a first side second end 196. Third side 190 includes a third side first end 198 and a third side second end 200. Second side 188 extends between ends 194 and 198 and is perpendicular to first side 186 and third side 190. Fourth side 192 is positioned opposite second side 188, has a curved contour and extends between ends 196 and 200. More specifically, fourth side 192 is shaped to have a curved contour that concentrically aligns with curved surface 152 of transition piece 52.

In the exemplary embodiment, the radius defining the contour of curved surface 152 is substantially similar to the radius defining the curved contour of fourth side 192. It should be understood that curved surface 152 and fourth side 192 define an interface between front socket 62 and transition piece 52. In the exemplary embodiment, the interface includes a gap 59 defined between curved surface 152 and fourth side 192. Gap 59 may have any width that enables self-aligning bearing seat 46 to function as described herein. Front anti-friction insert 58 is positioned in gap 59 and is secured to surface 192 using an adhesive, such as, but not limited to, glue. However, in other embodiments, anti-friction insert 58 is not secured to surface 192. Surface 192 is not lubricated in the exemplary embodiment. However, in other embodiments, surface 192 is lubricated. Front socket 62 also includes a plurality of uniformly spaced radially positioned openings 202 that each extend axially through socket sides 186 and 190. It should be appreciated that shaping fourth side 174 and fourth side 192 to have a curved contour that concentrically aligns with curved surface 152 facilitates optimizing the load/wear of anti-friction inserts 56 and 58.

Although the exemplary embodiment describes the interface between surfaces 152 and 174 as including gap 57, in other embodiments, the interface does not include gap 57. Instead, the interface is defined by surface 152 in direct contact with fourth surface 174. Moreover, it should be appreciated that the interface between surfaces 152 and 174 may take any form that enables self-aligning bearing seat 46 to function as described herein. Likewise, although the exemplary embodiment describes the interface between surfaces 152 and 192 as including gap 59, in other embodiments, the interface does not include gap 59. Instead, the interface is defined by surface 152 in direct contact with fourth surface 192. Moreover, it should be appreciated that the interface between surfaces 152 and 192 may take any form that enables self-aligning bearing seat 46 to function as described herein Back socket 60 and front socket 62 are positioned against back anti-friction insert 56 and front anti-friction insert 58, respectively. More specifically, fourth side 174 of back socket 60 is positioned against back anti-friction insert 56 and fourth side 192 of front socket 62 is positioned against front anti-friction insert 58. Back socket 60 is positioned against insert 56 such that first side 168 aligns with back end 154 of transition piece 52 and extends in a direction perpendicular to shaft 30. Front socket 62 is positioned against front anti-friction insert 58 such that first side 186 aligns with front end 156 of transition piece 52 and extends in a direction perpendicular to shaft 30. Back socket 60 and front socket 62 are manufactured from hardened steel. It should be appreciated that although the exemplary embodiment describes back socket 60 and front socket 62 as manufactured from hardened steel, in other embodiments, back socket 60 and front socket 62 may be manufactured from any material that enables self-aligning bearing seat 46 to function as described herein. It should be appreciated that although the exemplary embodiment describes each of sockets 60 and 62 as a single piece, in other embodiments, sockets 60 and 62 may each include two semicircular segments, or pieces, or any number of segments that enables self-aligning bearing seat 46 to function as described herein.

Third side 172 of back socket 60 and third side 190 of front socket 62 are positioned parallel to each other and are symmetrically positioned about centerline 136 to define a socket gap 204 that aligns with a gap 205 defined between back and front anti-friction inserts 56 and 58.

Bearing housing 64 is ring-shaped and has an L-shaped cross-sectional configuration including a housing first leg 206 and a housing second leg 208. Housing first leg 206 includes a housing inside surface 210 and a housing terminal surface 212 oriented perpendicular to housing inside surface 210. Housing second leg 208 includes a housing side surface 214 that extends away from and perpendicular to housing inside surface 210. Housing second leg 208 also includes a housing second terminal surface 216 oriented perpendicular to housing side surface 214. Housing second leg 208 includes a plurality of uniformly spaced radially positioned threaded openings 218 that each extend axially through housing side surface 214 into leg 208. Bearing housing 64 is positioned concentrically about and against back socket 60 and front socket 62. More specifically, housing inside surface 210 is positioned against second side 170 of back socket 60 and against second side 188 of front socket 62. Moreover, housing side surface 214 is positioned against first side 168 of back socket 60. It should be understood that bearing housing 64 is positioned so that openings 218 align with corresponding openings 184. Thus positioned, bearing housing 64 encases back socket 60, front socket 62, back anti-friction insert 56, front anti-friction insert 58, transition piece 52, back bearing seal ring 48, front bearing seal ring 50 and shaft 30.

Retaining plate 66 is ring-shaped and includes a body 220 having a rectangular cross-sectional configuration and a retaining plate arm 222 extending radially from body 220. More specifically, body 220 includes a first body side 224, a second body side 226, a third body side 228 and a boss 230. First body side 224 has a first end 232 and a second end 234. Second body side 226 extends perpendicularly from first end 232 and third body side 228 extends perpendicularly from second end 234. Thus, second side 226 is parallel to third body side 228.

Second body side 226 extends a distance to a second body side end 236. Boss 230 extends perpendicularly from second body side end 236 towards third body side 228 a distance to boss end 238. Body 220 includes radially positioned openings 244 that extend axially from third body side 228 to second body side 226. Retaining plate arm 222 has a rectangular cross-sectional configuration and shares a common side with body 220. More specifically, third body side 228 extends beyond body 220 and also constitutes one side of retaining plate arm 222. First arm side 240 extends perpendicularly, or radially, from boss end 238 to an arm terminus 242. It should be appreciated that third body side 228 also extends to arm terminus 242, that third body side 228 and first arm side 240 are parallel and that arm terminus 242 is perpendicular to both third body side 238 and first arm side 240.

Retaining plate 66 is positioned concentrically about shaft 30 and against front socket 62 and bearing housing 64. More specifically, second body side 226 is positioned against first side 186 of front socket 62 and boss 230 is positioned against housing inside surface 210, such that a retaining plate gap 246 is defined between first arm side 240 and housing terminal surface 212. It should be understood that retaining plate gap 246 is approximately the same width as socket gap 204. However, it should be appreciated that retaining plate gap 246 may have any width that enables self-aligning bearing seat 46 to function as described herein. Retaining plate 66 is positioned against front socket 62 such that openings 244 align with corresponding openings 202, 184 and 218 of front socket 62, back socket 60 and bearing housing 64, respectively. Upon aligning openings 218 and 244, a tensioning stud 68 is inserted through openings 244, 202 and 184 into openings 218 to mechanically couple bearing housing 64, retaining plate 66, back socket 60 and front socket 62 together. Tensioning stud 68 is a threaded bolt. It should be understood that any kind of alignment feature (not shown in FIG. 3) may be provided to accommodate the alignment of openings 244, 202 and 184 against openings 218.

Thus assembled and coupled, a back gap 248 is defined between housing second terminal surface 216 and top surface 92. Likewise, a front gap 250 is defined between first body side 224 and second top surface 124. It should be understood that a seal 252 is positioned in back gap 248 and front gap 250. It should be appreciated that gaps 248 and 250 accommodate the angular misalignment between back outer seal ring 72 and housing 64 and between front outer seal ring 104 and retaining plate 66, respectively. In the exemplary embodiment, seal 252 is a positive contact seal, such as, but not limited to, lip seals and boots. However, in other embodiments, seal 252 may be any kind of seal that enables self-aligning bearing seat 46 to function as described herein.

It should be understood that seal 252 is manufactured from rubber. Although the exemplary embodiment describes seal 252 as being manufactured from rubber, in other embodiments, seal 252 may be manufactured from any material that enables self-aligning bearing seat 46 to function as described herein. If a lubricant is used on surfaces 152, 174 or 192, seals 252 keep the lubricant (not shown in FIG. 3) on the inside of gaps 248 and 250, respectively, and keep contaminants to the outside of gaps 248 and 250, respectively.

During operation, bending of rotor blades 22 and horizontal and vertical translations in flexible supports of gearbox 34 may cause angular misalignment of shaft 30. More specifically, shaft 30 may experience a rotation centered about an intersection point 137 of centerlines 136 and 24 resulting in an angular displacement of shaft 30 at self-aligning bearing seat 46. Thus, shaft 30 may be angularly displaced at self-aligning bearing seat 46 horizontally, vertically, or both horizontally and vertically. Self-aligning bearing seat 46 accommodates these angular displacements, while maintaining rotation of shaft 30.

It should be understood that front bearing seal ring 50, back bearing seal ring 48 and transition piece 52 constitute a first assembly. Likewise, front socket 62, back socket 60, bearing housing 64, retaining plate 66 and tensioning studs 68 constitute a second assembly. It should be appreciated that angular misalignments are primarily accommodated by allowing angular movement of the first assembly inside the second assembly. Thus, moment loads due to the angular displacement are not reacted as moments in the second assembly. Rather, the moment loads are transformed to a force pair reaction between supports of shaft 30 at the main bearing 32 and at the gearbox 34. Angular movement of transition piece 52 inside the anti-friction inserts 56 and 58 accommodates or compensates for the angular displacement of shaft 30. As the angular displacement of shaft 30 decreases, the transition piece 52 returns to its original position. It should be understood that as the surface 152 of transition piece 52 repeatedly slides against anti-friction inserts 56 and 58, the insert material surface deteriorates.

The secondary way of accommodating angular displacements is by compressing the compliant and elastic anti-friction inserts 56 and 58. Thus, loads due to the angular displacement are transferred and dissipated. Compressing anti-friction inserts 56 and 58 also decreases a space between surface 152 and surfaces 174 and 192, thus accommodating or compensating for angular displacement of shaft 30. As the angular displacement of shaft 30 decreases, the compressed anti-friction inserts 56 and 58 expand to their original position. It should be understood that as anti-friction inserts 56 and 58 are repeatedly compressed and expanded the insert material deteriorates.

Consequently, as the anti-friction insert material deteriorates, tensioning studs 68 are turned to translate front socket 62 towards back socket 60. As back socket 60 and front socket 62 translate towards each other, back and front inserts 56 and 58, respectively, also translate towards each other. Translating inserts 56 and 58 towards each other increases the useful life of the inserts. It should be understood that the insert material maintains compliant contact with surfaces 152, 192 and 174 and wears out evenly due to symmetry.

Figure 4:
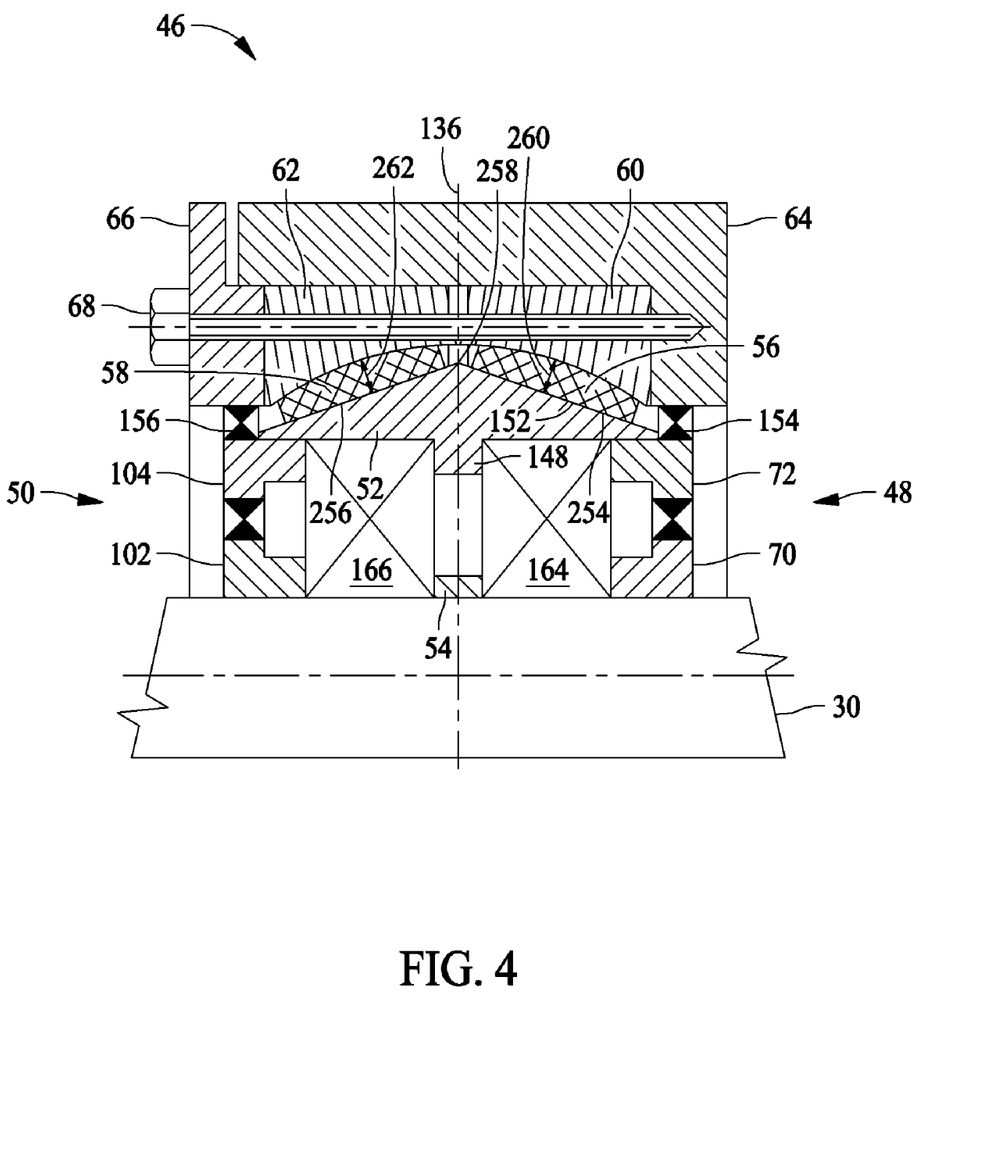
FIG. 4 is a partial cross-sectional view of an alternative exemplary embodiment of a self-aligning bearing seat.

The information shown in FIG. 4 is the same information shown in FIG. 3, as described in more detail below. As such, components illustrated in FIG. 4 that are identical to components illustrated in FIG. 3, are identified using the same reference numerals used in FIG. 3.

FIG. 4 is a partial cross-sectional view of an alternative exemplary embodiment of self-aligning bearing seat 46. This alternative exemplary embodiment is similar to that shown in FIG. 3. However, second body surface 152 of transition piece 52 does not include a curved contour. Instead, second body surface 152 includes a first linear surface 254 and a second linear surface 256, each sloping away from an apex 258 positioned intermediate back end 154 and front end 156. First linear surface 254 slopes down from apex 258 to back end 154, and second linear surface 256 slopes down from apex 258 to front end 156. Second body surface 152 includes two sloping surfaces instead of a single curved contour to facilitate reducing manufacturing costs.

By changing the contour of second body surface 152 a space 260 between back socket 60 and first linear surface 254 increases. Likewise, a space 262 between front socket 62 and second linear surface 256 increases. Anti-friction inserts 56 and 58 do not require bonding to any surfaces, are self-centering and may be injection molded to allow for conformance. It should be understood that during the angular misalignment, anti-friction inserts 56 and 58 rotate angularly together with the first assembly and slide against back socket 60 and front socket 62. This embodiment also facilitates replacing inserts 56 and 58.

Figure 5:
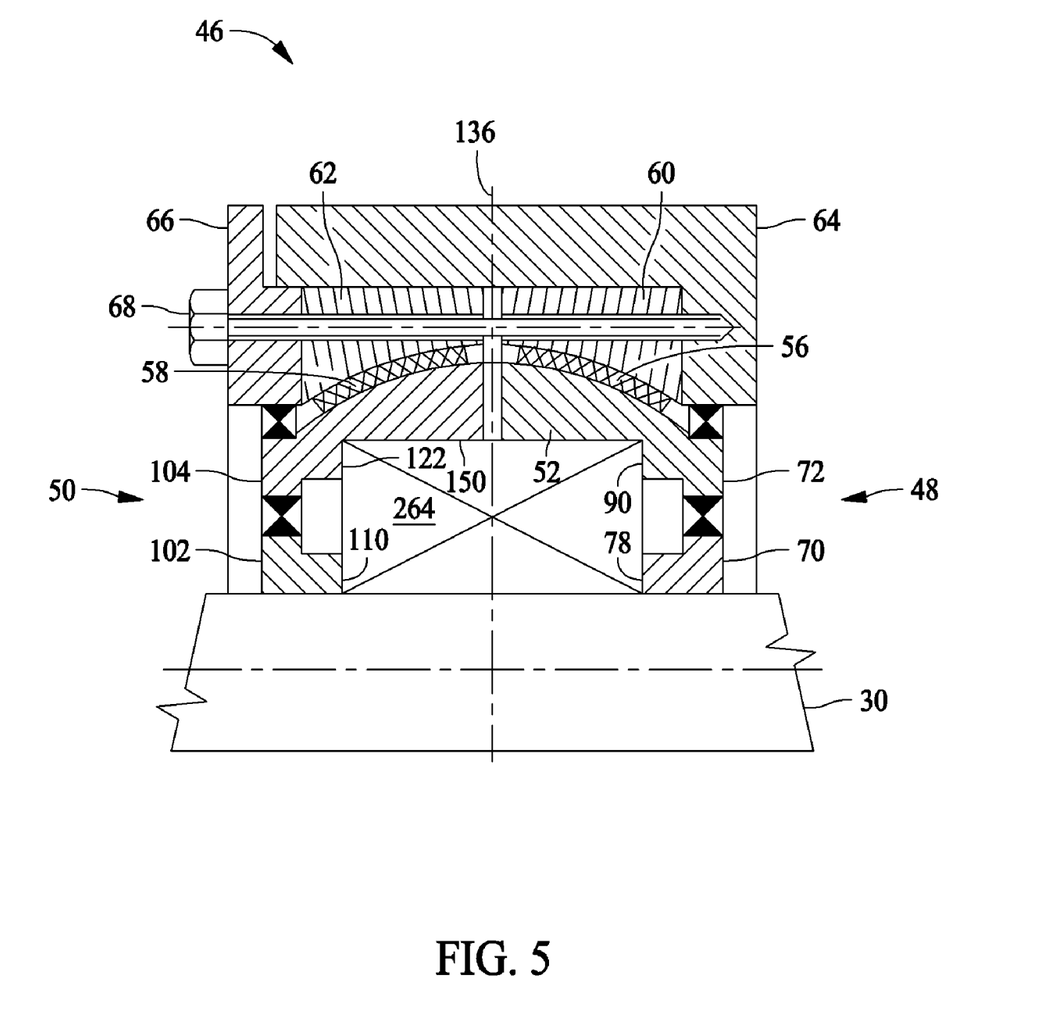
FIG. 5 is a partial cross-sectional view of another alternative exemplary embodiment of a self-aligning bearing seat.

The information shown in FIG. 5 is the same information shown in FIG. 3, as described in more detail below. As such, components illustrated in FIG. 5 that are identical to components illustrated in FIG. 3, are identified using the same reference numerals used in FIG. 3.

FIG. 5 is a partial cross-sectional view of another alternative exemplary embodiment of self-aligning bearing seat 46. This alternative embodiment is similar to that shown in FIG. 3. However, transition piece 52 is divided into two halves and is combined with back bearing seal ring 48 and front bearing seal ring 50. More specifically, the back half of transition piece 52 is combined with back outer seal ring 72 and the front half is combined with front outer seal ring 104. Transition piece 52 does not include member 148. This alternative embodiment does not include spacer 54. Thus, in this alternative exemplary embodiment, a single bearing cavity 264 is provided. More specifically, shaft 30, first body surface 150, inner long leg terminal surface 110, outer long leg terminal surface 122, first terminal surface 90 and terminal surface 78 define bearing cavity 264. It should be understood that bearing cavity 264 is oriented symmetrically about centerline 136 and circumscribes shaft 30. Bearing cavity 264 may accommodate at least one bearing (not shown in FIG. 5).

Figure 6:
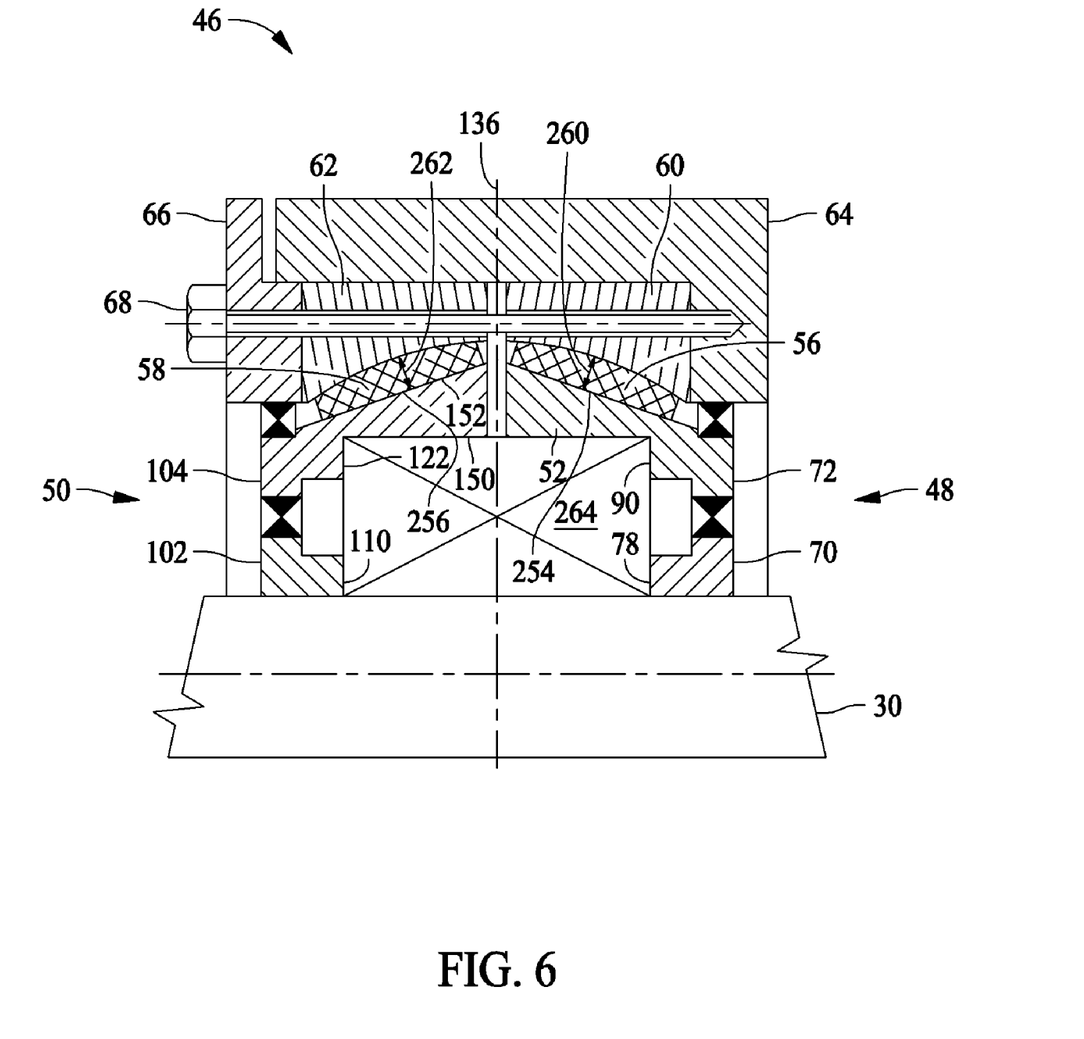
FIG. 6 is a partial cross-sectional view of another alternative exemplary embodiment of a self-aligning bearing seat.

The information shown in FIG. 6 is the same information shown in FIGS. 4 and 5, as described in more detail below. As such, components illustrated in FIG. 6 that are identical to components illustrated in FIGS. 4 and 5, are identified using the same reference numerals used in FIGS. 4 and 5.

FIG. 6 is a partial cross-sectional view of another exemplary embodiment of self-aligning bearing seat 46. This alternative embodiment is similar to those shown in FIGS. 4 and 5. More specifically, self-aligning bearing seat 46 includes the modified contour of second body surface 152 including sloping surfaces 254 and 256, and related increases in spaces 260 and 262. Moreover, transition piece 52 is divided into two halves and is combined with back bearing seal ring 48 and front bearing seal ring 50. More specifically, the back half of transition piece 52 is combined with back outer seal ring 72 and the front half is combined with front outer seal ring 104. Transition piece 52 does not include member 148. This alternative exemplary embodiment does not include spacer 54, so a single bearing cavity 264 is provided circumscribing shaft 30. Anti-friction inserts 56 and 58 do not require bonding to any surfaces, are self-centering and may be injection molded to allow for conformance. This embodiment also facilitates replacing inserts 56 and 58.

Figure 7:
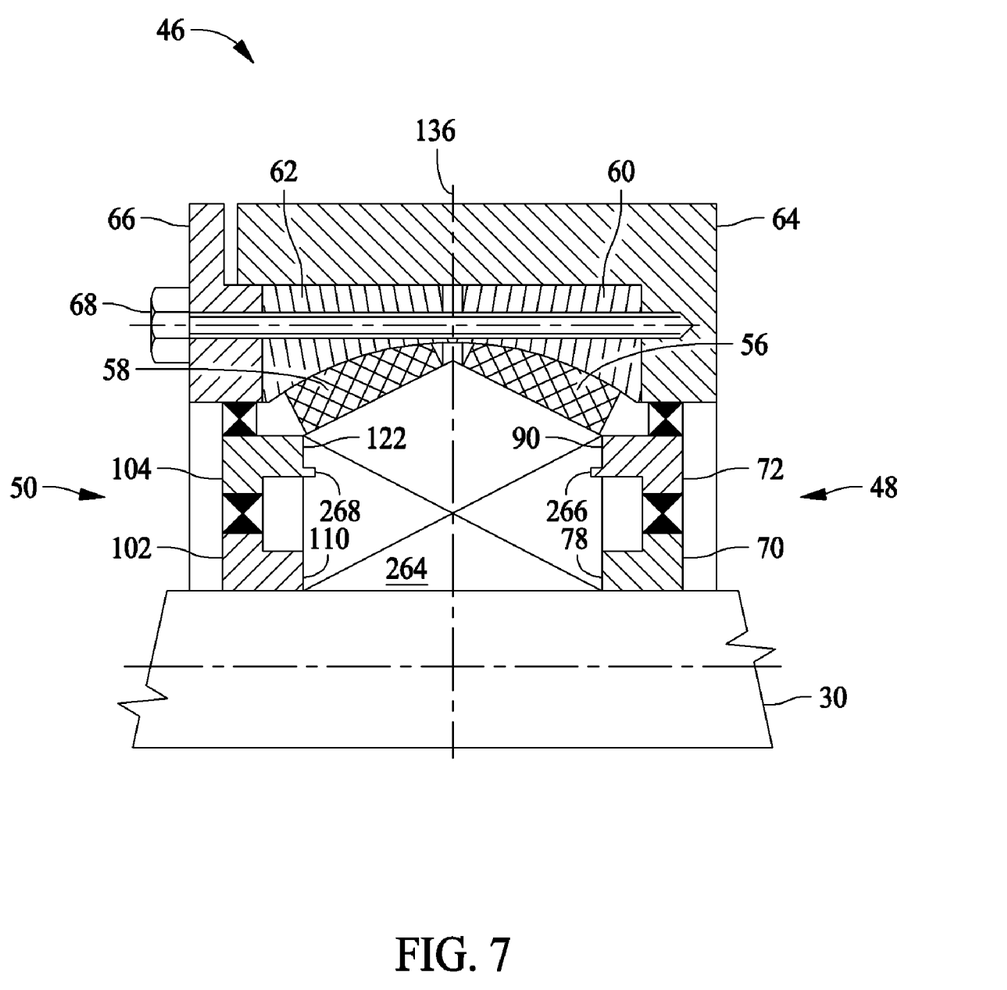
FIG. 7 is a partial cross-sectional view of yet another alternative exemplary embodiment of a self-aligning bearing seat.

The information shown in FIG. 7 is the same information shown in FIG. 3, as described in more detail below. As such, components illustrated in FIG. 7 that are identical to components illustrated in FIG. 3, are identified using the same reference numerals used in FIG. 3.

FIG. 7 is a cross-sectional view of another exemplary embodiment of self-aligning bearing seat 46. This alternative embodiment is similar to that shown in FIG. 3. However, self-aligning bearing seat 46 does not include transition piece 52. Instead, self-aligning bearing seat 46 includes single bearing cavity 264 that accommodates at least one bearing (not shown in FIG. 7) whose outside diameter is tapered to directly contact, or interface, with back anti-friction insert 56 and front anti-friction insert 58. Anti-friction inserts 56 and 58 do not require bonding to any surfaces, are self-centering and may be injection molded to allow for conformance. This embodiment also facilitates replacing inserts 56 and 58.

In this embodiment, back outer seal ring 72 and front outer seal ring 104 include arms 266 and 268, respectively, extending therefrom. More specifically, arm 266 extends perpendicularly away from short leg terminal surface 90 and arm 268 extends perpendicularly away from outer long leg terminal surface 122. Arms 266 and 268 axially align and couple back outer seal ring 72 and front outer seal ring 104, respectively, with an outer ring of a bearing (not shown in FIG. 7).

In each embodiment the above-described self-aligning bearing seat facilitates increasing the useful life of main bearings. More specifically, in each embodiment, the self-aligning bearing seat mitigates moments associated with shaft misalignment and transfers forces to an interface between first assembly and second assembly. As a result, turbine operation facilitates minimizing damage to the main bearing. Accordingly, turbine performance and component useful life are each enhanced in a cost effective and reliable manner.

Exemplary embodiments of self-aligning bearing seats are described above in detail. The self-aligning bearing seats are not limited to use with the specific turbine embodiments described herein, but rather, the self-aligning bearing seats can be utilized independently and separately from other self-aligning bearing seat components described herein. Moreover, the invention is not limited to the embodiments of the self-aligning bearing seats described above in detail. Rather, other variations of self-aligning bearing seat embodiments may be utilized within the spirit and scope of the claims.

While the invention has been described in terms of various specific embodiments, those skilled in the art will recognize that the invention can be practiced with modification within the spirit and scope of the claims.

What is claimed is:

1. A method of assembling a rotor shaft assembly, said method comprising:

forming a first assembly extending about a rotor shaft;

forming a second assembly extending about the first assembly to form a self-aligning bearing seat substantially circumscribing the rotor shaft, the second assembly comprising a front socket and a back socket;

creating an interface defined between the first assembly and the second assembly, wherein the interface substantially circumscribes the rotor shaft; and positioning an anti-friction insert at the interface defined between the first assembly and the second assembly, wherein the anti-friction insert substantially circumscribes the rotor shaft, and the anti-friction insert comprises a front anti-friction insert corresponding to the front socket and a back anti-friction insert corresponding to the back socket.

2. A method in accordance with claim 1 wherein positioning an anti-friction insert further comprises positioning an anti-friction insert fabricated from at least one of thermoplastic, thermoset, elastomer, co-polymer, fiber reinforced plastic, babbit, bronze and rubber at the interface.

3. A method in accordance with claim 1 wherein forming the first assembly comprises forming the first assembly from at least a transition piece, a front bearing seal ring and a back bearing seal ring.

4. A method in accordance with claim 1 further comprising defining at least one adjustable bearing cavity within the first assembly.

5. A method in accordance with claim 1 further comprising forming the second assembly from at least one adjustment mechanism configured to adjust a socket gap defined between the front socket and the back socket.

6. A method in accordance with claim 5 further comprising repositioning at least one adjustment mechanism to facilitate increasing a useful life of the anti-friction insert.

7. A method in accordance with claim 5 further comprising moving the front socket towards the back socket such that the front anti-friction insert is shifted towards the back anti-friction insert, thereby facilitating an increase of a useful life of the anti-friction insert.

* * * * *